United States Patent [19]

Hayashi et al.

[11] 4,386,130

[45] May 31, 1983

[54] LAMINATED FILM

[75] Inventors: Kenji Hayashi; Shoji Kobayashi; Keisuke Ohshima, all of Ohtsu, Japan

[73] Assignee: Toray Industries, Inc., Tokyo, Japan

[21] Appl. No.: 305,856

[22] Filed: Sep. 25, 1981

[30] Foreign Application Priority Data

Sep. 25, 1980 [JP] Japan ............... 55-132348

[51] Int. Cl.³ .................. B32B 7/02; B32B 15/08
[52] U.S. Cl. .................... 428/215; 428/216; 428/458; 428/461; 428/463; 428/464; 428/701
[58] Field of Search ............ 428/461, 472, 432, 433, 428/701, 458, 215, 216, 463, 464; 427/108, 109

[56] References Cited

U.S. PATENT DOCUMENTS

| | | | |
|---|---|---|---|
| 3,698,946 | 10/1972 | Kaspaul et al. | 428/432 |
| 3,846,152 | 11/1974 | Franz | 428/333 |
| 3,962,488 | 6/1976 | Gillery | 427/109 |
| 4,017,661 | 4/1977 | Gillery | 428/472 X |
| 4,166,876 | 9/1979 | Chiba et al. | 427/108 X |
| 4,234,654 | 11/1980 | Yatabe et al. | 428/472 X |

Primary Examiner—Thomas J. Herbert, Jr.
Attorney, Agent, or Firm—Armstrong, Nikaido, Marmelstein & Kubovcik

[57] ABSTRACT

A laminated film which comprises (A) an organic polymer film, (B) a thin metal layer having a thickness of 30 to 500 Å laminated on at least one surface of said organic polymer film, and (C) a transparent thin layer containing metal compounds and having a thickness of 0.02 to 0.3μ laminated on said thin metal layer (B). At least 60 wt. % of said transparent thin layer (C) comprises zirconium (Zr), silicon (Si) and oxygen, at least 60 molar % of metal elements in the above transparent thin layer (C) comprises zirconium (Zr) and silicon (Si) and molar ratio Zr/Si is in the range of 80/20 to 20/80.

13 Claims, 2 Drawing Figures

LAMINATED FILM

BACKGROUND OF THE INVENTION

The present invention relates to a selective light-transmitting laminated film which transmits visible rays but reflects infrared rays. More particularly, the present invention relates to a selective light-transmitting laminated film having improved resistance against abrasion, light, weather and heat.

There has been known a laminated film comprising an organic polymer film vacuum-deposited with a thin layer of a metal such as aluminum, silver, copper or gold for the purpose of transmitting visible rays and reflecting infrared rays. Those laminated films are generally coated with a protective organic polymer layer having a thickness of 1-100μ applied to the metal surface for preventing the thin metal layer from scratch, stain or oxidation. Infrared ray reflectance of such a laminated film depends on the thickness of said metal layer. For obtaining a high infrared reflectance, the thickness of the metal layer must be increased. However, if the infrared reflectance is increased, visible ray transmission is inevitably decreased seriously to cause an insufficient lighting and unclear recognition of substances. Further, if the infrared reflectance is to be increased as described above, visible ray reflectance is also increased, whereby unpleasant reflected light diverges outside.

For overcoming the above defects, there has been known a process wherein the surface of said thin metal layer is coated with inorganic dielectrics having a high refractive index such as titanium oxide, bismuth oxide or zinc sulfide having a thickness of several hundred angstroms to form so-called anti-reflection layer, thereby decreasing the visible ray reflection, and increasing the transparency. Those inorganic dielectrics are applied to the thin metal layer surface by a physical film-forming means such as vacuum evaporation or sputtering or a chemical film-forming means such as solution coating or chemical vacuum deposition. However, if the above single metal compound is used as the anti-reflection coating in the form of a film having a large surface area, it has poor mechanical properties such as low abrasion resistance and poor flexibility and it is easily peeled off from the substrate by abrasion or bending. There has been proposed a method of improving those mechanical properties by incorporating an organic substance such as an organic titanate or organic silicate therein. However, problems still remain in that properties such as light resistance including ultraviolet resistance, weather resistance and heat resistance are deteriorated. Particularly, in order to obtain a film of a large surface area at low costs, the film must be formed at a high speed. However, as the film-forming speed is increased, the above defects become remarkable.

BRIEF SUMMARY OF THE INVENTION

An object of the present invention is to provide a laminated film having a high visible ray transmittance and a high infrared ray reflectance.

Another object of the present invention is to provide a laminated film having a high visible ray transmittance and a high infrared ray reflectance as well as excellent resistance against abrasion, light, weather and heat.

In order to accomplish the above-mentioned objects, in accordance with the present invention, there is provided a laminated film comprising:

(A) an organic polymer film, (B) a thin metal layer having a thickness of 30 to 500 Å laminated on at least one surface of said organic polymer film, and (C) a transparent thin layer containing metal compounds and having a thickness of 0.02-0.3μ laminated on said thin metal layer (B), wherein at least 60 wt. % of said transparent thin layer (C) comprises zirconium (Zr), silicon (Si) and oxygen, and at least 60 molar % of metal elements in the above transparent thin layer (C) comprises zirconium (Zr) and silicon (Si) in the range of molar ratio Zr/Si of 80/20 to 20/80.

Other objects as well as advantageous features of the invention will become apparent from a study of the following portion of the specification, the Claims and the attached drawings.

DETAILED DESCRIPTION OF THE PREFERRED EMBODIMENTS

Figure 1:
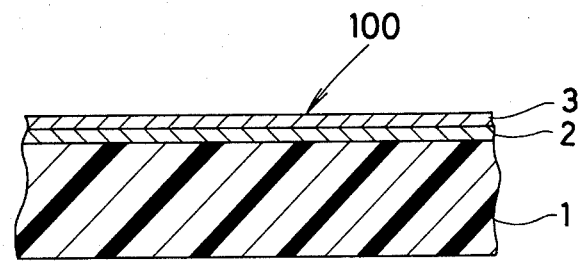
FIG. 1 is a cross-sectional view of a laminated film in accordance with the present invention.

As shown in FIG. 1, a laminated film 100 comprises an organic polymer film (A) 1 as base, a thin metal layer (B) 2 having a thickness of 30-500 Å laminated on said base and a transparent thin layer (C) 3 containing metal compounds and having a thickness of 0.02-0.3μ laminated on said thin metal layer (B) 2. The thin metal layer (B) has functions of reflecting infrared rays and transmitting visible rays partially. The transparent thin layer (C) has an anti-reflection effect on visible rays. Therefore, the layer (C) has a function of controlling the visible ray reflectance which is increased as infrared reflectance is increased by increasing the thickness of the thin metal layer (B).

Figure 2:
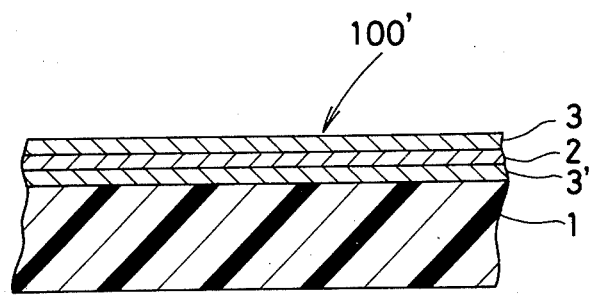
FIG. 2 is a cross-sectional view of another embodiment of a laminated film in accordance with the present invention.

A laminated film 100' shown in FIG. 2 is the same as the laminated film 100 shown in FIG. 1 except that a transparent thin layer 3' which is the same as or which has the same effects as that of the transparent thin layer (C) containing the above metal compound is interposed between the organic polymer film base (A) and the thin metal layer (B). The laminated film of this embodiment has a merit in that it has an improved durability.

Organic polymer film (A) used in the present invention has a thickness of 6 to 1,000μ, preferably 9 to 125μ, a high flexibility and a light transmittance of at least 40%, preferably at least 70%, to lights of wave lengths of 400 to 2,000 nm. As the organic polymers, there may be mentioned, for example, polyesters such as polyethylene terephthalate, polybutylene terephthalate and polyethylene napthalate, polyolefins such as polyethylene and polypropylene, polyamides such as nylon 6, nylon 66 and nylon 12, polycarbonates, polymethyl acrylate, polyvinyl chloride, polyvinylidene chloride, polysulfones, polyphenylene sulfide, polyphenylene oxide, polyether sulfones, polyacrylonitrile, polytetrafluoroethylene, polyamidoimides, polyimides, polyvinylalcohol, and cellulose acetates. They may be used in the form of homopolymers, copolymers of at least two compounds or mixtures thereof.

Organic polymer film (A) may be oriented biaxially or monoaxially. Further, organic polymer films (A) may contain additives such as ultraviolet absorbents, antioxidants, coloring agents, plasticizers, stabilizers and antistatic agents suitably depending on the use thereof. Among them, oganic polymer films (A) suitable for obtaining the effects of the present invention include biaxially oriented polyethylene terephthalate, biaxially oriented polypropylene, biaxially oriented polyamides, polycarbonate, polymethyl acrylate and polyimide films.

As metals contained in thin metal layer (B), those having a bulk specific resistance of up to $10^{-4}$ ohm.cm are preferred. For example, there may be used single metals such as aluminum, copper, silver, gold, tin, zinc, iron, nickel, cobalt, palladium, titanium, zirconium or chromium, or an alloy or mixture of two or more metals mainly comprising the above metals such as duralumin, Sterling silver, brass, bronze, white gold, stainless steel or nichrome. Among them, those having a bulk specific resistance of up to $5 \times 10^{-6}$ ohm.cm are preferred. Further, in order to facilitate the bending in molding and laminating steps or to prevent cracking or delamination in the stretching step, those having high ductility and malleability are preferred. From these points, as thin metal layer (B), there is used preferably silver, copper, gold, aluminum or an alloy mainly comprising the above metal is preferred. Particularly preferred results are obtained when silver or an alloy mainly comprising silver is used.

The thickness of thin metal layer (B) is an important factor in obtaining the visible ray transparency and infrared ray reflectance. In the present invention, the thickness is expressed by a value calculated from the weight determined by atomic absorption analysis or radiation analysis method. Namely, the thickness is represented by a value obtained by dividing the weight of the layer on the film having a given surface area by the bulk specific gravity. The thickness of thin metal layer (B) should be in the range of 30 to 500 Å. If the thickness is less than 30 Å, the infrared ray reflectance is extremely low and, on the other hand, if it is more than 500 Å, the visible ray transmittance is extremely low unfavorably. The optimum thickness of the metal layer which varies depending on the material used is preferably in the range of 50 to 300 Å, particularly 80–200 Å. In case of silver or said alloy containing silver as main component, the most preferred thickness is in the range of 80 to 200 Å.

Thin metal layer (B) is formed by, for example, vacuum evaporation, sputtering, ion plating, plating, chemical vacuum evaporation and thermal decomposition. For forming thin metal layer (B) over the whole, broad surface area of organic polymer film (A) or transparent thin layer (C) uniformly at a high speed, the vacuum evaporation and sputtering method are suitable. From the viewpoints of the adhesion to the film and the control of the composition of the alloy, the sputtering method is most suitable.

In metal compound-containing transparent thin layer (C), at least 60 molar % of the whole metal elements in the metal compounds constituting this layer should comprise Zr and Si and the Zr/Si molar ratio should be in the range of 80/20 to 20/80. If the sum of Zr and Si is less than 60 molar % based on the whole metal elements, the visible ray anti-reflection effect is insufficient or mechanical properties thereof are unsatisfactory. Particularly, light resistance, weather resistance and heat resistance are insufficient unfavorably. If the Zr/Si molar ratio in the above composition is higher than 80/20, the tough layer cannot be obtained and the adhesion thereof is insufficient, whereby an abrasion resistance cannot be obtained. On the other hand, if Zr/Si molar ratio is less than 20/80, the resulting film is discolored by irradiation with ultraviolet rays, the infrared reflectance is reduced or weather resistance and heat resistance of the film are unsatisfactory. Thus, such a film is not fit for use for a long period of time.

It is necessary for obtaining satisfactory properties of both transparent thin layer and laminated film of the present invention that the sum of zirconium (Zr), silicon (Si) and oxygen is at least 60 wt. % based on transparent thin layer (C). Metal elements other than silicon or zirconium, such as titanium, zinc and cadmium, as well as non-metal elements and organic substances may be contained in an amount of less than 40 wt. % in transparent thin layer (C). Said transparent thin layer (C) has preferably a visible ray transmittance of preferably at least 60%. Particularly, a visible ray transmittance of at least 80% is effective for attaining the purpose of the present invention.

In order to obtain a high visible ray transmittance and a high infrared reflectance, it is preferred that transparent thin layer (C) has a thickness of 0.02–0.3μ. Particularly, a thickness of 0.03–0.09μ is effective for attaining the purpose of the present invention.

In the lamination of said transparent thin layer (C), a composition for forming this layer may be applied to the surface of thin metal layer (B) by vacuum thin filmforming method such as sputtering and vacuum evaporation or, alternatively, starting materials or an intermediate which finally forms said transparent thin layer is applied thereto by vacuum evaporation, sputtering or coating and a reaction such as polymerization, condensation or oxidation is carried out to obtain the transparent thin film of the intended composition. For example, the layer may be formed by applying a mixture of at least one of zirconium compounds of the general formula:

$$ZrX_l(OR)_{4-l}$$

wherein R represents an alkyl group of 1–6 carbon atoms, X represents a group selected from β-diketone compounds and β-keto ester compounds, and l represents an integer of 0–4 and at least one of silicon compounds of the general formula:

$$SiY_l(OR)_{4-l}$$

wherein R represents an alkyl group of 1–6 carbon atoms, Y represents an alkyl group of 1–6 carbon atoms, a halogenated alkyl group, phenyl group, vinyl group or glycidoxy group and l represents an integer of 0–2 or the hydrolyzed mixture thereof to said thin metal layer (B) or to organic polymer film (A) (in an embodiment shown in FIG. 2) to form a coating layer and then heat-treating and drying the same to effect a polycondensation reaction. If necessary, other materials, intermediate and additives may be added thereto provided that the final composition thereof satisfies the above conditions of the transparent thin layer.

As typical examples of zirconium compounds and silicon compounds represented by the above general formulae, the following compounds may be mentioned, which by no means limit the compounds usable in the present invention.

The silicon compounds include, for example, tetrabutoxysilane, tetraethoxysilane, methyltrimethoxysilane, methyltriethoxysilane, methyltributoxysilane, vinyltrimethoxysilane, γ-methacryloxypropyltrimethoxysilane, phenyltrimethoxysilane, γ-glycidoxypropyltrimethoxysilane, γ-mercaptotrimethoxysilane, N-β-aminoethylpropyltrimethoxysilane, and γ-glycidoxypropylmethyldiethoxysilane. The zirconium compounds include, for example, zirconium acetylacetone compound, zirconium tetraalkoxides (such as tetrabutyl zirconate and tetrapropyl zirconate), zirconium-trialkoxymonoalkylacetoacetates (such as zirconium-tributoxy-monoethylacetoacetate), zirconium-dialkoxy-dialkyl-acetoacetates, zirconium-monoalkoxy-trialkylacetoacetates (such as zirconium-monobutoxy-triethylacetoacetate) and zirconium-alkyl-acetylacetonate compounds.

The desired coating layer may be obtained also by reactive vacuum evaporation or reactive sputtering wherein a mixture or alloy of zirconium and silicon is deposited thereon in the form of atoms or molecules in an oxygen-containing atmosphere under vacuum.

The laminated film of the present invention has characteristic features of a high visible ray transmittance and a high infrared ray reflectance and also quite excellent resistance against abrasion, light, weather and heat.

It has been considered generally that titanium oxide and zinc oxide having a refractive index of at least 2.0 are effectively used as the anti-reflection coating of thin metal layer. Therefore, it has been said that thin layers of silicon oxide, etc. having a low refractive index is unsuitable as the anti-reflection coating of the thin metal layer. This fact has been proved theoretically. However, after investigations, the inventors have succeeded in the visible ray anti-reflection and remarkable improvement in visible ray transmittance without causing a significant reduction in infrared ray reflectance by using a silicon compound such as silicon oxide as principal component not alone but in combination with a zirconium compound in amounts of a given ratio in accordance with the present invention. With the zirconium compound contained in at least a given amount, light (ultraviolet ray) resistance and weather resistance are improved and, in addition, with the mixture of zirconium compound and silicon compound, heat resistance is also improved.

The laminated film of the present invention comprises as basic constituting elements said organic polymer film (A), thin metal layer (B) and transparent layer (C) laminated as shown in FIGS. 1 and 2 as described above.

The surface or the back of the laminate of the present invention may further, suitably be laminated with other layers such as protective layer, adhesive layer, ultraviolet ray-absorbing layer, surface-hardening layer and dew condensation-preventing layer provided that they do not degrade the effects of the present invention. Prior to the formation of thin metal layer (B) on organic polymer film (A) or transparent thin layer as shown in FIG. 2 according to the present invention, it may be subjected to a known surface treatment such as EC treatment, plasma treatment, surface-roughening, reverse sputtering and etching.

The laminated film of the present invention may be used mainly as a sunshine controlling film, lagging film, low-temperature insulating film or heat-protective mask for workers as a single film or a laminated structure on a glass or plastic plate. In addition, the laminated film may be used for insulating static electricity and electromagnetic waves or for the production of transparent, electrical heating elements and display electrodes.

The following examples illustrate the embodiments of the present invention. In the examples, the following measuring methods were employed.

Light transmittance: measured with Spectrophotometer Type 323 (a product of Hitachi Seisaku-sho) at a wave length of 550 nm.

Infrared ray reflectance: measured with Spectrophotometer Type 323 (a product of Hitachi Seisaku-sho) at a wave length of 1700 nm.

Abrasion resistance: measured with an abrasion tester according to JIS L 0823 (a product of Daiei Kagaku Seiki Seisaku-sho). The results are represented by the number of times of rubbing until the delamination occurs with a load of 500 g.

Metal layer thickness: Film thickness calculated from the weight according to atomic absorption analysis.

Transparent thin layer thickness: Geometrical layer thickness obtained by the transmission electron microscopic observation of an ultra-thin sample piece.

Transparent thin layer composition: measured with ESCA Type ES-200 (a product of Kokusai Denki Kabushiki Kaisha) according to electron spectroscopy for chemical analysis (ESCA). The total weight percent of zirconium, silicon and oxygen and the composition of zirconium and silicon was calculated from the counting number of each detected elements by compensating with detective sensitivity of ESCA.

Surface electric resistivity: Surface electric resistivity of a film having a width of 35 mm determined using copper electrodes at an electrode distance of 35 mm with a load of 500 g (unit: ohm/square).

Light resistance: Ultraviolet Fadeometer (a product of Tokyo Shibaura Denki Kabushiki Kaisha with Mercury lamp H-400 F) was used. Light resistance is represented by degree of maintenance of infrared ray reflectance after the irradiation for 800 hours.

Weather resistance: Sunshine Carbon Weather Meter (a product of Suga Shiken-ki Kabushiki Kaisha) was used. Weather resistance is represented by degree of maintenance of infrared ray reflectance after the irradiation for 500 hours.

Heat resistance: A circulation type hot air oven (a product of Tabai Seisaku-sho Kabushiki Kaisha) was used. Heat resistance is represented by degree of maintenance of infrared ray reflectance after allowing the sample to stand at 80° C. for 720 hours.

EXAMPLES 1–7 AND COMPARATIVE EXAMPLES 1–5

A thin silver layer having a thickness of 120 Å was deposited on a biaxially oriented polyethylene terephthalate film having a light transmittance of 87% and a thickness of 25μ by sputtering method.

The sputtering was effected by applying a direct current voltage of 550 V to a silver target having a purity of 99.9% by magnetron method under an argon pressure of $5 \times 10^{-3}$ mmHg. The resulting silver layer had a surface electric resistivity of 9 ohm/square.

Then, a transparent thin layer comprising a zirconium compound and a silicon compound was formed on the thin silver layer to obtain a selective light-transmitting laminated film.

The transparent thin layer was further coated with a mixture of the following solutions A and B in such a mixing ratio that Zr/Si molar ratio would be controlled to a value shown in Examples 1-7 and Comparative Examples 1-5 shown in Table 1 by means of a gravure roll coater and dried and heat-treated at 140° C. for two minutes to obtain a layer having a thickness of 0.05μ.

Metal elements in the transparent thin layer comprised zirconium and silicon and the total weight percent of zirconium, silicon and oxygen in said transparent thin layer was obtained as the value represented in Table 1.

| Solution A: | |
|---|---|
| Tributoxyzirconium monoethylacetoacetate | 44 g |
| Isopropyl alcohol | 593 g |
| Butanol | 297 g |
| Toluene | 297 g |

| Solution B: | |
|---|---|
| Hydrolyzed tetrabutyl silicate solution | 52 g |
| Isopropyl alcohol | 300 g |
| Butanol | 150 g |
| Toluene | 150 g |

The hydrolyzed tetrabutyl silicate solution contained in solution B was obtained by stirring 32 g of butyl silicate, 16 g of ethyl alcohol and 8.6 g of 0.1 N aqueous hydrochloric acid solution together to effect dehydration treatment. The solution has a solid content of 12.5%.

When zirconium compound was used alone or when Zr/Si molar ratio was higher than 80/20, the resulting layer was powdery and milky and had an extremely low abrasion resistance. In such a case, infrared reflectance was reduced after the heat resistance test. When Zr/Si molar ratio was less than 20/80, the resulting layer had poor light resistance and weather resistance and, in addition, light transmittance and infrared ray reflectance thereof were low.

Optical properties, abrasion resistances and durabilities of those laminated film were measured to obtain the results shown in Table 1.

EXAMPLES 8-10

Laminated films containing a transparent thin layer having a Zr/Si molar ratio of 70/30, 50/50 or 30/70 and the total weight of zirconium, silicon and oxygen of 95, 96 or 96% respectively were obtained in the same manner as in the preceding examples except that tributoxyzirconium monoethyl acetoacetate in solution A was replaced with tetrabutylzirconium. The layers had light transmittance of 75, 75 and 74% and infrared ray reflections of 78, 78 and 79%. Degrees of maintenance of infrared reflections after the light resistance test with the Ultraviolet Fadeometer were 80, 80 and 85%, respectively. Abrasion resistance were as high as more than 100 in all cases.

COMPARATIVE EXAMPLE 6

A solution comprising 3 parts of tetrabutyl titanate and 97 parts of a coating solution (solution B in the above examples) mainly comprising hydrolyzed tetrabutyl silicate solution was applied to the silver-coated polyethylene terephthalate film used in the above examples by means of a wire bar and then dried at 140° C. for two minutes to form a transparent thin layer.

Thus resulting film had a light transmittance of 70% and an infrared reflectance of 75%. The film had a degree of maintenance of infrared ray reflectance of 20% after light resistance test by the irradiation with ultraviolet rays. The film was discolored and the transparent thin layer thereof was whitened after the light resistance test.

EXAMPLE 11

A layer having a silver/gold weight ratio of 2:1 was deposited on a biaxially oriented polyethylene terephthalate film having a light transmittance of 87% and a thickness of 25μ by sputtering method. The metal layer had a thickness of 100 Å, surface electric resistivity of 14 ohm/square, light transmittance of 63% and infrared ray reflectance of 77%.

On this layer, a transparent thin layer comprising a mixture of zirconium oxide and silicon oxide and having a thickness of 0.045μ was formed by sputtering method. The sputtering was effected by placing zirconium and silicon targets on a cathode and introducing a gaseous

TABLE 1

| No. | Zr/Si Molar ratio | Total weight of Zr, Si and O (%) | Light transmittance (%) | Infrared reflectance (%) | Abrasion resistance (times) | Degree of maintenance after light resistance test (%) | Degree of maintenance after heat resistance test (%) |
|---|---|---|---|---|---|---|---|
| Examples | | | | | | | |
| 1 | 80/20 | 95 | 75 | 77 | 30 | 80 | 80 |
| 2 | 70/30 | 96 | 76 | 77 | 55 | 85 | 85 |
| 3 | 60/40 | 96 | 76 | 78 | at least 100 | 85 | 85 |
| 4 | 50/50 | 97 | 75 | 78 | at least 100 | 90 | 85 |
| 5 | 40/60 | 98 | 73 | 79 | at least 100 | 85 | 90 |
| 6 | 30/70 | 97 | 73 | 78 | at least 100 | 85 | 85 |
| 7 | 20/80 | 98 | 71 | 78 | 50 | 85 | 85 |
| Comparative Example | | | | | | | |
| 1 | 0 | 47 | 80 | — | 55 | 60 | |
| 2 | 100/0 | 94 | 72 | 75 | 1 | 40 | 45 |
| 3 | 90/10 | 95 | 73 | 75 | 1 | 50 | 50 |
| 4 | 10/90 | 97 | 65 | 75 | 20 | 50 | 55 |
| 5 | 0/100 | 97 | 60 | 75 | 20 | 45 | 60 | mixture of argon, oxygen and nitrogen (mixing ratio: 40:12:48 in vol. %) therein. It was confirmed by atomic absorption analysis that the resulting layer had a Zr/Si molar ratio of 55/45. According to ESCA, the transparent thin layer consisted of zirconium, silicon and oxygen.

The laminated film had a light transmittance of 83% and an infrared reflectance of 76%. As for abrasion resistance, the film was unchanged after rubbing 100 times and its optical properties were unchanged after the light resistance test and heat resistance test.

Infrared ray reflection after the weather resistance test by means of a sunshine weather meter was as high as 80%.

EXAMPLES 12-16

A thin metal layer of gold, palladium, aluminum or silver-aluminum alloy (weight ratio: 10:1) was formed on a biaxially oriented polyethylene terephthalate film having a light transmittance of 87% and a thickness of 38μ by sputtering method.

The thin metal layer was coated with a mixture of solutions A and B used in the above examples in such a mixing ratio that Zr/Si molar ratio would be 50/50 by means of a wire bar. The coating layer was dried at 140° C. for two minutes to obtain a uniform, transparent thin layer having a thickness of 0.06μ.

The metal element of said transparent thin layer was zirconium and silicon and the total weight of zirconium, silicon and oxygen in said coating layer was 97%.

Thickness, optical properties, abrasion resistance and durability of the resulting laminated film were measured to obtain the results shown in Table 2.

TABLE 2

| No. | Metal | Metal layer thickness (Å) | Abrasion resistance (number of times of rubbing) | Infrared reflectance (%) | Degree of maintenance after light resistance test (%) | Degree of maintenance after heat resistance test (%) |
| --- | --- | --- | --- | --- | --- | --- |
| Example 12 | Gold | 250 | at least 100 | 88 | 90 | 90 |
| Example 13 | Palladium | 60 | at least 100 | 50 | 85 | 80 |
| Example 14 | Aluminum | 200 | at least 100 | 82 | 80 | 85 |
| Example 15 | Aluminum | 120 | at least 100 | 72 | 80 | 80 |
| Example 16 | Silver-aluminum | 180 | at least 100 | 85 | 85 | 85 |

EXAMPLE 17

A biaxially oriented polypropylene film having a thickness of 15μ was adhered to the transparent thin layer of the laminated film obtained in Example 4 to form a laminated film. The film had a light transmittance of 68% and an infrared ray reflectance of 72%. Degree of maintenance of infrared ray reflectance after the light resistance test, weather resistance test and heat resistance test were 85%, 80% and 90%, respectively.

What is claimed is:

1. In a laminated film having:
 (A) an organic polymer film,
 (B) a thin metal layer having a thickness of 30 to 500 Å laminated on at least one surface of said organic polymer film,
 (C) the improvement which comprises coating said thin metal layer with a transparent thin layer containing metal compounds and having a thickness of 0.02 to 0.3μ laminated on said thin metal layer (B), wherein at least 60 wt. % of said transparent thin layer (C) comprises zirconium, silicon and oxygen, and at least 60 molar % of metal elements in the above transparent thin layer (C) comprises zirconium and silicon in the range of molar ratio Zr/Si of 80/20 to 20/80, whereby said film shows significant increases in resistance against abrasion, light, weather, and heat.

2. A laminated film as recited in claim 1 wherein a transparent thin layer having a thickness of 0.02 to 0.3μ and containing metal compounds is further interposed between said organic polymer film (A) and said thin metal layer (B).

3. A laminated film as recited in claim 1 or 2, wherein said organic polymer film (A) has a thickness of 6 to 1,000μ and a transmittance of at least 40% in the wave length region of 400-2,000 nm.

4. A laminated film as recited in claim 1 or 2, wherein the organic polymer in said organic polymer film (A) is selected from the group consisting of homopolymers, copolymers of at least two compounds and mixtures of at least two compounds of polyesters such as polyethylene terephthalate, polybutylene terephthalate and polyethylene naphthalate, polyolefins such as polyethylene and polypropylene, polyamides such as nylon 6, nylon 66 and nylon 12, polycarbonates, polymethyl acrylate, polyvinyl chloride, polyvinylidene chloride, polysulfones, polyphenylene sulfide, polyphenylene oxide, polyether sulfones, polyacrylonitrile, polytetrafluoroethylene, polyamidoimide, polyimides, polyvinylalcohol and cellulose acetates.

5. A laminated film as recited in claim 1 or 2, wherein said organic polymer film (A) is a biaxially oriented film of an organic polymer selected from the group consisting of polyethylene terephthalate, polypropylene, polyamides, polycarbonates, polymethyl acrylate and polyimides.

6. A laminated film as recited in claim 1 or 2, wherein the metal in said thin metal layer (B) is selected from the group consisting of aluminum, copper, silver, gold, tin, zinc, iron, nickel, cobalt, palladium, titanium, zirconium, chromium, duralumin, Sterling silver, brass, bronze, white gold, stainless steel and nichrome having a bulk specific resistance of $10^{-4}$ ohm.cm.

7. A laminated film as recited in claim 1 or 2, wherein said thin metal layer (B) has a thickness of 50 to 300 Å.

8. A laminated film as recited in claim 1 or 2, wherein said transparent thin layer (C) has a visible ray transmittance of at least 60%.

9. A laminated film as recited in claim 1 or 2, wherein said transparent thin layer (C) has a thickness of 0.03 to 0.09μ.

10. In a laminated film having:
(A) an organic polymer film,
(B) a thin metal layer having a thickness of 30 to 500 Å laminated on at least one surface of said organic polymer film,
(C) the improvement which comprises coating said thin metal layer with a transparent thin layer containing metal compounds and having a thickness of 0.02 to 0.3μ laminated on said thin metal layer (B),
wherein said transparent thin layer (C) is formed by applying a mixture of at least one of at least one of zirconium compounds of the general formula:

wherein R represents an alkyl group of 1–6 carbon atoms, X represents a group selected from β-diketone compound and β-keto ester compound, and l represents a integer of 0–4 and at least one of silicon compounds of the general formula:

wherein R represents an alkyl group of 1–6 carbon atoms, Y represents an alkyl group of 1–6 carbon atoms, vinyl group of glycidoxy group and l represents an integer of 0–2 or the hydrolyzed mixture thereof to said thin metal layer (B) to form a coating layer and then heat-treating the coating layer.

11. A laminated film as recited in claim 10, wherein the zirconium compound is selected from the group consisting of zirconium acetylacetone compound, zirconium tetraalkoxides, zirconium trialkoxy-monoalkylacetoacetates, zirconium dialkoxy-dialkyl-acetoacetates, zirconium monoalkoxytrialkylacetoacetates and zirconium alkyl-acetyl-acetonate, and the silicon compound is selected from the group consisting of tetrabutoxysilane, tetraethoxysilane, methyltrimethoxysilane, methyltriethoxysilane, methyltributoxysilane, vinyltrimethoxysilane, γ-methacryloxypropyltrimethoxysilane, phenyltrimethoxysilane, γ-glycidoxypropyltrimethoxysilane, γ-mercaptotrimethoxysilane, N-β-aminoethylpropyltrimethoxysilane and γ-glycidoxypropylmethyldiethoxysilane.

12. A laminated film as recited in claim 10, wherein a transparent thin layer having a thickness of 0.02 to 0.3μ and containing metal compounds is further interposed between said organic polymer film (A) and said thin metal layer (B).

13. A laminated film as recited in claim 12, wherein the zirconium compound is selected from the group consisting of zirconium acetylacetone compound, zirconium tetraalkoxides, zirconium trialkoxy-monoalkylacetoacetates, zirconium dialkoxy-dialkyl-acetoacetates, zirconium monoalkoxy-trialkylacetoacetates and zirconium alkyl-acetylacetonate, and the silicon compound is selected from the group consisting of tetrabutoxysilane, tetraethoxysilane, methyltrimethoxysilane, methyltriethoxysilane, methyltributoxysilane, vinyltrimethoxysilane, γ-methacryloxypropyltrimethoxysilane, phenyltrimethoxysilane, γ-glycidoxypropyltrimethoxysilane, γ-mercaptotrimethoxysilane, N-β-aminoethylpropyltrimethoxysilane and γ-glycidoxypropylmethyldiethoxysilane.

* * * * *